Patented Mar. 3, 1931

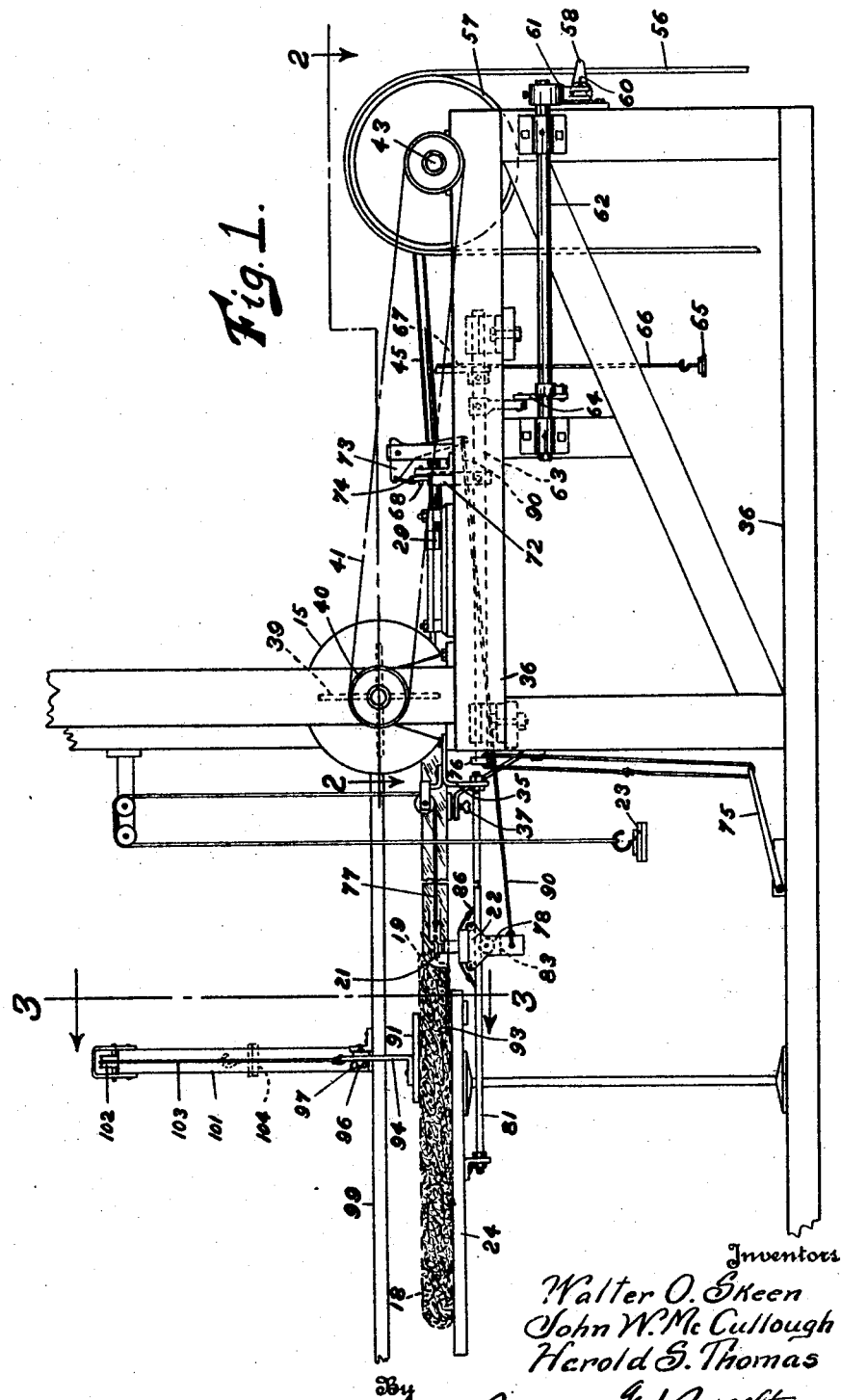

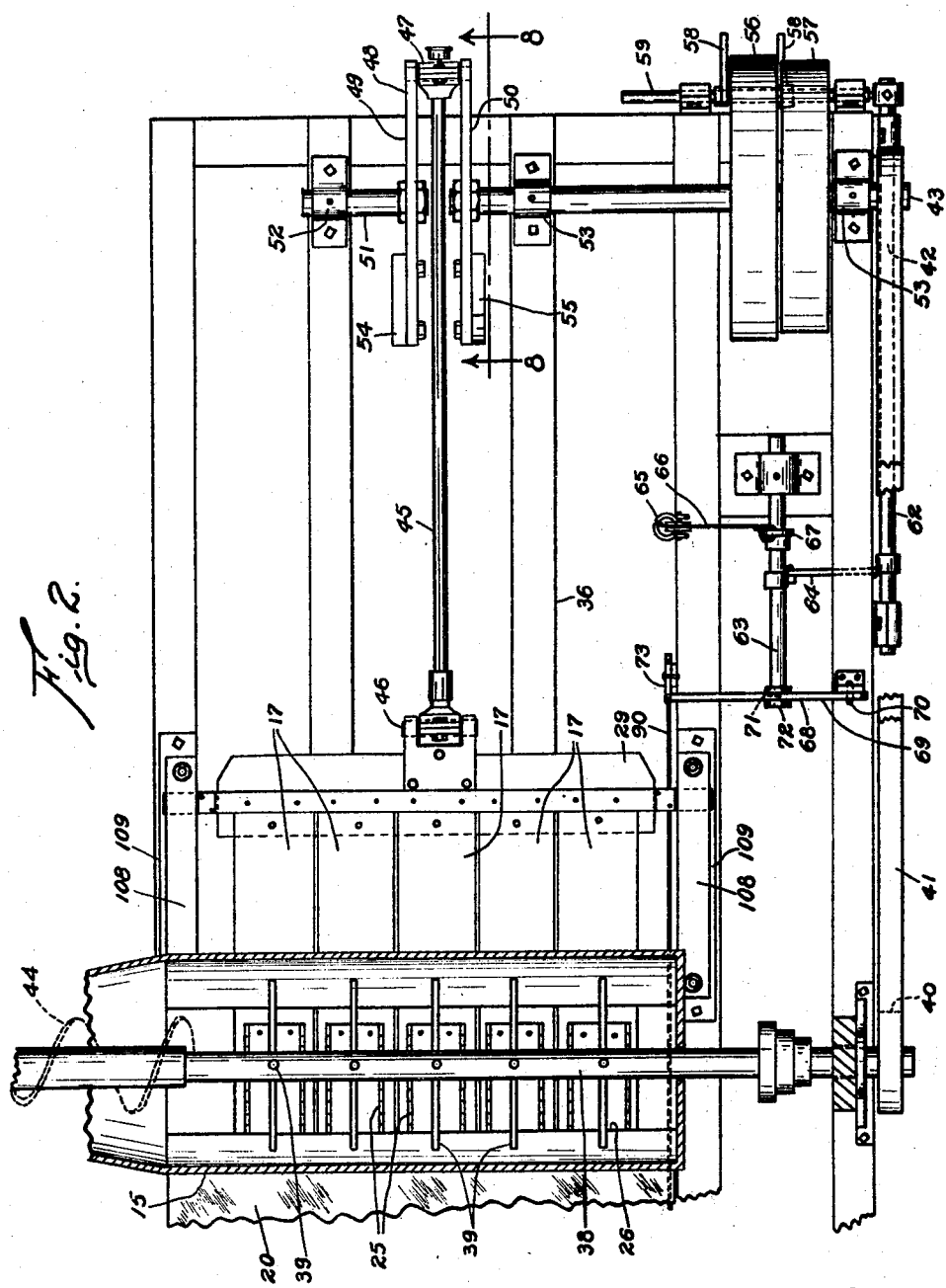

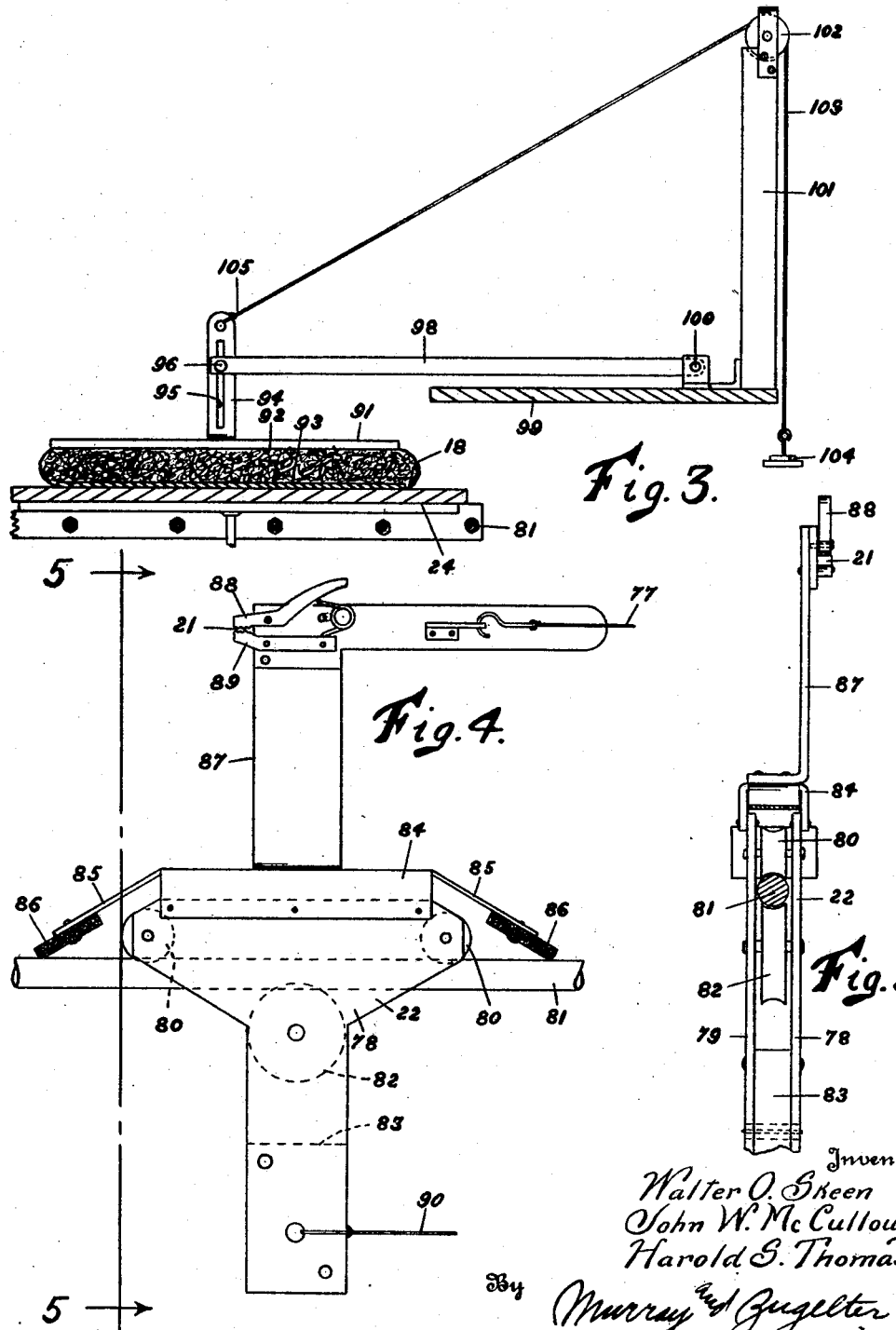

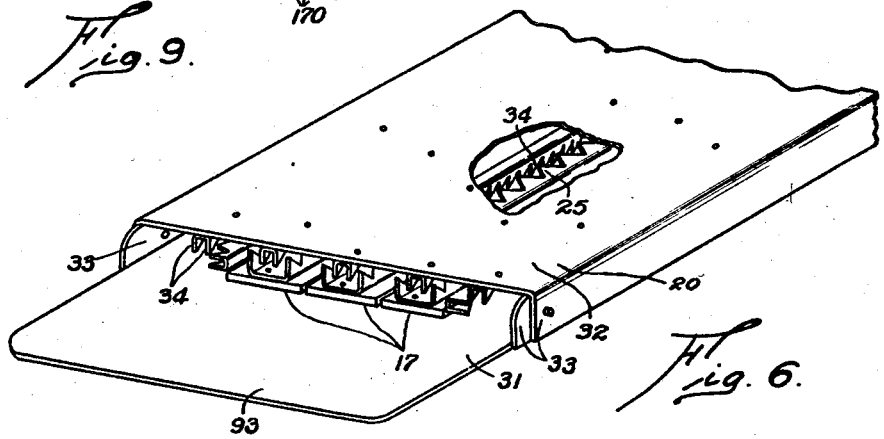
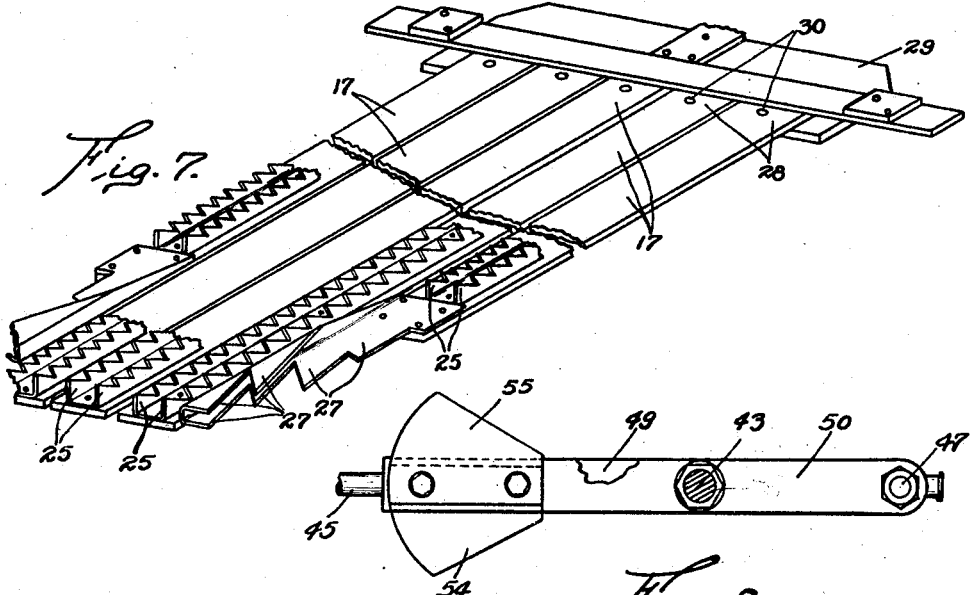

1,794,480

UNITED STATES PATENT OFFICE

WALTER O. SKEEN AND JOHN W. McCULLOUGH, OF GREENFIELD, OHIO, AND HAROLD S. THOMAS, OF CHATHAM, ONTARIO, CANADA, ASSIGNORS TO THE AMERICAN PAD AND TEXTILE COMPANY, OF GREENFIELD, OHIO, A CORPORATION OF OHIO

METHOD AND APPARATUS FOR MANUFACTURING CUSHIONS OR PADS

Application filed June 13, 1929. Serial No. 370,648.

This invention relates to a method and apparatus for stuffing wide casings such as those of cushions or pads for vehicle seats.

An object is to provide such machine with means whereby uniformity of cushion or pad thickness may be attained while the casings are being stuffed.

Another object is to so construct certain moving parts of the machine that their efficiency will not be impaired by accumulations of dust and lint.

Another object of the invention is to provide a machine for the above purpose, which is practically free of vibration.

Another object is to provide means whereby the padding material may be inserted into the casings in such a manner that the resulting pad or cushion will carry an excess of padding material in selected portions thereof.

These and other objects are attained by the means described herein and disclosed in the accompanying drawings, in which:

Fig. 1 is a side elevational view of the machine of invention showing a partly filled casing or container in position thereon.

Fig. 2 is a cross-sectional view on line 2—2 of Fig. 1.

Fig. 3 is a cross-sectional view on line 3—3 of Fig. 1.

Fig. 4 is a side elevational view of a carriage member forming part of the invention.

Fig. 5 is a cross-sectional view on line 5—5 of Fig. 4.

Fig. 6 is an isometric view, parts being broken away, of a delivery tube of the device.

Fig. 7 is an isometric view of a reciprocating plunger which operates within the tube.

Fig. 8 is a cross-sectional view on line 8—8 of Fig. 2, showing a counterbalancing device.

Fig. 9 is an end view of a modified form of the device shown in Fig. 6.

The device of this invention is adapted to receive, in its hopper 15, a quantity of fibrous filling material such as cotton, hair or the like 16. From the hopper, said material is pushed, by means of a wide reciprocating plunger comprising pusher elements 17, into a wide bag-like casing or container 18 one end 19 of which is open to permit of insertion of the delivery tube 20 (Fig. 6). It is to be understood that in initial position for operation, a wide casing is placed about the wide tube 20, said tube extending thereinto for a distance equal to the length of the container. Opposite sides of the container or casing thereupon are secured, by means of clamp devices 21, to a pair of carriage members 22 (Fig. 1) which, by reason of weights 23, tend to yieldingly urge the container toward the machine. Each time that some stuffing material is forced into the container by the reciprocating plunger, the resistance of the weights is overcome and the container moves away from the delivery tube and along the table 24. Continued reciprocations of the plunger and insertions of padding material cause the container to move outwardly until completely filled, whereupon it is manually released from the clamp devices 21. The open end of the container is then closed to preclude escape of the padding material.

Each of the pusher members 17 is provided, upon its upper face, with a plurality of rows of upright teeth 25, the teeth extending forwardly so as to grip and carry a quantity of padding material from the opening 26 in the hopper 15, only upon forward movement of the plunger. The number of pushers required will depend upon the width of the container to be filled. The outermost pushers preferably are provided with teeth 27 the side faces of which lie in a horizontal plane. These teeth are larger, but fewer in number, than teeth 25. Teeth 27 are adapted to pack the padding into the corners of the container, and to supply the proper amount of padding material at the edges thereof.

Each pusher 17 is secured at its rearward end 28, to a light weight cross head 29 which is adapted to be reciprocated in a manner to be explained later. The securing means may be a removable bolt 30 extending through coinciding perforations in the pushers and cross head.

The delivery tube 20 comprises casing members 31 and 32 each having side flanges 33 whereby the casing members may be joined as shown in Fig. 6. The casing members are adapted to be spaced from one another to form the tube 20 in which the plunger may be reciprocated. Rows of depending teeth 34 are secured to the inner face of casing member 32, said teeth being disposed between the rows of teeth on the pushers 17, and adapted to preclude the return of padding material brought forward by the plunger. The delivery tube 20 is removably secured to a bracket 35 of the machine, by means of a securing device indicated at 37. The tube 20 extends rearwardly to the opening 26 in hopper 15, thereby rendering the teeth 25 (Fig. 2) accessible to the padding material contained in the hopper. An agitator 38, comprising a plurality of spaced arms 39, is disposed within the hopper 15 and may be rotated by means of a belt driven pulley 40 fixed on the agitator shaft. Belt 41 may be driven by means of a pulley 42 fixed on the main shaft 43. A screw 44 on the agitator shaft serves to convey padding material to the hopper from any suitable source of supply, not shown.

The means for reciprocating the cross head 29 and the plunger attached thereto, comprises a connecting rod 45 one end of which is pivotally secured to the mid-point of the cross head as at 46, and the opposite end of which has a bearing 47 on a crank 48. Crank 48 consists of a pair of arms 49 and 50, arm 50 being fixed at approximately its mid-point, to the end of main shaft 43. The arm 49 is likewise fixed, in the same manner, to a stud shaft 51 disposed in axial alignment with shaft 43 and rotatably supported in a bearing 52 on the frame of the machine. Bearings 53 serve to rotatably support the shaft 43.

Means are provided for reducing vibration resulting from the reciprocatory motion of cross head 29. Said means comprises the weights 54 and 55 bolted or otherwise fixedly secured to the free ends of arms 49 and 50, respectively. Weight 54 is disposed, substantially, on one side of a line drawn through the axes of members 43 and 47 (Fig. 8), while weight 55 is disposed, substantially, on the opposite side of said line. The rotation of shaft 43 is counter-clockwise, wherefore it will readily be understood that gravitation of the weights from the position shown in Fig. 8 will assist in producing forward movement of the plunger through one half of the forward plunger stroke; the remaining half of said forward stroke will be retarded by the succeeding upward movement of the weights. As a consequence of this arrangement, the first half of the rearward plunger stroke will be resisted by the weights, and the second half of said stroke will be assisted thereby. This arrangement of crank and weights, together with a light weight cross head 29, considerably reduces the vibration resulting from the movement of reciprocatory parts.

As shown in Figs. 1 and 2, the crank shaft 43 may be rotated by means of a driven belt 56 contacting a pulley fixed to the crank shaft. Said belt is adapted to be automatically shifted over to an idler pulley 57, loosely mounted upon the crank shaft, at the termination of each container stuffing operation. The means for automatically shifting the belt comprises arms 58 adapted to contact opposite sides of the belt, said arms being fixedly mounted upon a shiftable bar 59 suitably supported upon the frame of the machine. One end of said bar is pivoted, as at 60, to a lever 61 suitably secured to a longitudinal rockable shaft 62 also movable in bearings on the frame. A shaft 63 is arranged to rock with shaft 62 by reason of the arm and link connection 64. A weight 65, hanging from a cable 66 the free end of which is secured to an upright arm 67 on shaft 63, serves to constantly urge the shaft 63 into rotation such as would, in the absence of a restraining means to be described, cause the belt shifting mechanism to keep the belt upon the idler pulley 57. The restraining means 68, however, serves to maintain the driving relation shown in Fig. 2. Mechanism 68 comprises a bar 69 pivoted at 70 and disposed above and transversely of shaft 63. A notch 71 in the bar is adapted to receive the upper end of an arm 72 which is fixed on shaft 63. Engagement of the lever and notch serve to preclude rotation of the shaft 63 under the influence of weight 65. When, however, the lever 69 is raised by moving the bell crank 73, which is linked to the lever at 74, the notch is disassociated from arm 72 thereby releasing said arm for shifting of the belt to neutral position. The bell crank 73 is connected to the carriage 22, previously referred to, in a manner to be described hereinafter. Foot pedal 75, connected by means of a strap or the like to an arm 76 on the rockable shaft 63, provides a means whereby the operator manually shifts the belt 56 for setting the machine in operation. It should be clear from the foregoing that the machine is set in operation by manually operated means, and stopped by automatic means.

As stated before, a wide casing 18, to be stuffed, initially is slipped over, or envelopes, the wide delivery tube 20. The open end of the container, therefore, is disposed near the bracket 35 which supports the tube. Carriage 22, carrying the clamp device 21, will be found at the same location because of the action of the weight 23 which, through the agency of cable 77, yieldingly urges the carriage rearwardly. It is to be understood that a second carriage, identical with that shown in Fig. 1, is disposed on the opposite side of the machine for holding the opposite side of container 18. With the various parts in the foregoing position, the clamps 21 are manually actuated for gripping opposite sides of the container.

A detailed description of carriage 22 will now be given. The carriage comprises a pair of spaced plates 78 and 79 between which are rotatably supported a pair of grooved wheels 80. Wheels 80 are adapted to ride along a round rod or track 81, one end of which is fixed to the machine as shown in Fig. 1, and the opposite end of which is secured to the stationary table 24. A third grooved wheel 82 serves to preclude removal of the carriage from the track. The lower portions of the plates 78—79 have connected thereto the weight 83 which serves to balance the carriage, retaining it in an upright position on the track. The upper portions of said plates are held in spaced relation by means of a channel member 84 riveted or otherwise fixedly secured to said upper portions of the plates as shown in Figs. 4 and 5. Integral with the channel member, and extending therefrom, are the inclined members 85 each of which carries a scraping or rubbing means 86, which latter are adapted to contact the track and remove therefrom any lint or other foreign material which would interfere with free movement of the carriage.

An upright member 87, which is fixed on channel 84, as shown, provides a means for supporting the clamp device 21. It should be clear, from the drawings, that the pivoted clamp jaw 88 is spring urged toward stationary jaw 89. The cable indicated at 90 connects the carriage with the bell crank 73 as is shown in Figs. 1 and 2. The cable is of such length that it will be drawn taut, and thereby actuate the bell crank, upon predetermined forward movement of the carriage. It will be understood that actuation of the bell crank will occur upon completion of the stuffing operation, whereupon the belt shifter will operate to render the machine inoperative.

Means is provided for precluding the formation of humps which, because of its width, tend to form in the pad during the stuffing operation. Said means comprises a presser foot 91 having a flat under surface 92 which is adapted to rest lightly upon the container 18 while the plungers are in operation. It should be noted that the presser foot overhangs a shelf or extension 93 on tube 20 (Fig. 1), wherefore it should be clear that the casing, while being stuffed, will be precluded from bulging vertically. To the top of member 91 is fixedly secured a vertical bracket 94 provided with a longitudinal slot 95, which slot is adapted to receive a threaded bolt 96 provided with a thumb nut 97. Bolt 96 passes through an arm 98 which is pivotally mounted, as at 100 upon any suitable support 99. An upright 101 on the support carries at its upper end a grooved wheel 102 over which passes a suitable cable 103 one end of which supports a weight 104, and the other end 105 of which is attached to the member 94. The weight 104 is sufficiently heavy to relieve the container of a considerable portion of the weight of the smoothing device. When it is desired to remove the stuffed container from the machine, the smoothing device may be placed in a convenient position by moving it upwardly about its pivot 100.

In Fig. 9 is shown a means whereby a cushion may be stuffed so as to make it thick along one side and relatively thinner along the opposite side. This is accomplished by providing the machine with pushers 170 the teeth 250 of which are graduated in length. The cooperative teeth 340 of the upper casing member are correspondingly altered in length, and the upper casing member is supported upon the lower casing member at an angle thereto, as shown. It is readily evident that the larger or longer teeth to the right of the tube will convey more filling material than the smaller teeth at the opposite side. When using this tube and plunger arrangement, the smoothing device 91 is adjusted, by means of bolt 96, to accommodate the resultant sloping top surface of the cushion.

The operation of the device is as follows: A wide container 18 of cloth or the like, having an opening in one end thereof, is slipped over the tube 20, the extension 93 of the tube being disposed near the closed end of the container. The corners of the container adjacent to the open end thereof are then clamped to carriage 22 in a manner previously explained. The pedal 75 may then be actuated for starting the machine. As the cross-head 29 is reciprocated in its spaced guides 108—109 by the action of the crankshaft, the teeth on the plunger pick up a quantity of stuffing material from the hopper and carry it into the tube. As explained before, the depending teeth in the tube preclude return of said material to the hopper upon rearward movement of the plunger. It is to be noted that the stuffing material is delivered from the tube in the form of a series of longitudinal, transverse, flat ribbons set on edge. The individual ribbons are formed, apparently because of the spaces between the teeth on the plunger and tube. These ribbons are ejected, by the ends of the pushers, in an upright position with the lower longitudinal edges thereof resting on the extension 93. As these ribbons are forced, one by one, into the container 18, the container moves outwardly along the table 24, carrying with it the weight retarded carriages 22. It should be clearly apparent that by increasing the weights 23, outward movement of the container 18 will be resisted proportionally. It follows, therefore, that the filling material will compact itself proportionally in order to cause outward movement of the container, which results in the production of a heavier pad or cushion. The smoothing device 91, resting on the pad or cushion at a point adjacent to the discharge end of tube 20, cooperates with the wide plunger in preventing the formation of humps and irregularities in the cushion and assures the formation of standardized and uniform cushions. The pad is released from the clamps 21, as soon as the filling operation is terminated by the automatically operated belt shifter.

It is to be understood that, although a preferred form of the invention is illustrated and described herein, various modifications and changes in structural details falling within the scope of the appended claims, may be made without departing from the spirit of the invention.

What is claimed is:

1. In a machine for inserting padding material into casings, the combination of a hopper having an opening therein, said hopper being arranged to receive quantities of padding material, a reciprocable plunger comprising teeth arranged to move in proximity with the opening in the hopper and to remove therefrom quantities of padding material, a delivery tube for receiving the padding material removed from the hopper by the teeth of the plunger, said delivery tube having an elongated mouth for communication with a casing to be filled, and means for the delivery of different amounts of padding material to selected portions of the casing by selected portions of the said mouth.

2. In a machine for inserting padding material into casings, the combination of a hopper having an opening therein, said hopper being arranged to receive quantities of padding material, a reciprocable plunger comprising pushers of various capacities for removing from the opening in the hopper different quantities of padding material, and a delivery means, for communication with a casing to be filled, for receiving the padding material from the plunger and delivering said padding material in various quantities to selected portions of the casing.

3. The combination with means for inserting padding material into a container, of a table for supporting the container, and movable pressure means comprising a pivoted arm and a presser foot on the arm, the presser foot being adjustable relative to the arm and to the table for forming a restricted passage through which the container may pass during the inserting operation.

4. The combination with means for inserting ribbons of padding material disposed on edge, into a casing, of a table for supporting the casing, and a presser foot disposed in spaced relation with the table and arranged to normally apply pressure upon the edges of said ribbons of padding material during the inserting operation.

5. The combination with means for inserting padding material into a casing, of a table for supporting the casing, and a presser foot disposed in spaced relation with the table and normally contacting the casing during the inserting operation.

6. In combination, a means for consecutively inserting into a casing individual ribbons of padding material set on edge, and positive means for retaining said ribbons in said position in the casing during the inserting operation.

7. In combination, a means for inserting a series of ribbons of padding material into a casing, in parallelism and on edge, and means for precluding displacement of said ribbons in the casing during the inserting operation.

8. In a device of the class described the combination of a hopper arranged to receive quantities of padding material, reciprocable plunger means for successively removing quantities of padding material from the hopper, a stationary delivery tube for receiving the padding material from the plunger means, said tube being arranged for insertion into a casing to be filled with padding material, a table for supporting the casing during the filling operation, a carriage and a track therefor disposed on opposite sides of the table, means on each carriage for clamping engagement upon the casing, and means on each carriage for removing accumulations of foreign substances from the tracks.

9. In a device of the class described, the combination of a container retarding means comprising a longitudinal track extending in the direction of movement of the container, a carriage on the track, a clamp device on the carriage for attachment to a container, means yieldingly urging the carriage in one direction of movement along the track, and means on the carriage for removing accumulations of foreign substances from the track.

10. In a device of the class described the combination with a moving container, of a container retarding means comprising a longitudinal track extending in the direction of movement of the container, a carriage comprising wheels resting upon the track, means yieldingly urging the carriage along the track, a clamp means on the carriage for removably securing the container thereto, and means extending beyond the carriage and contacting the track for removing accumulated foreign substance therefrom.

11. A carriage for movement along an elevated track, comprising a pair of spaced body members, a pair of wheels arranged to rest upon the track, said wheels being disposed for free rotation between the body members, a third wheel freely rotatable relative to the body members and disposed below the track in proximity therewith, an upper portion and a lower portion on the carriage, a clamp device on the upper portion and a balance weight on the lower portion, means extending from the carriage in opposite directions and beyond the first mentioned wheels for contacting the track and removing accumulated foreign substance therefrom upon movement of the carriage along the track.

12. The method of manufacturing cushion pads, consisting of inserting into an open end of a bag like casing a padding material delivery tube having an elongated mouth, forcing padding material through the tube and into the closed end of the casing thereby moving the casing away from the tube, and confining the sides of the filled portion of the casing to preclude bulging of the sides of the casing.

13. The method of manufacturing cushion pads, consisting of inserting into an open end of a bag-like casing a padding material delivery tube having an elongated mouth, forcing individual upright ribbons of padding through the tube and into the closed end of the casing thereby producing relative movement of the casing and tube, and applying pressure to opposite edges of the said ribbons to preclude spreading thereof during the filling operation.

In testimony whereof, I have hereunto subscribed my name this 4th day of June, 1929.

HAROLD S. THOMAS.

In testimony whereof, we have hereunto subscribed our names this 28th day of May, 1929.

WALTER O. SKEEN.
JOHN W. McCULLOUGH.